No. 700,891. Patented May 27, 1902.
H. C. BLACK.
CAN TESTING APPARATUS.
(Application filed Nov. 20, 1901.)
(No Model.) 3 Sheets—Sheet 1.
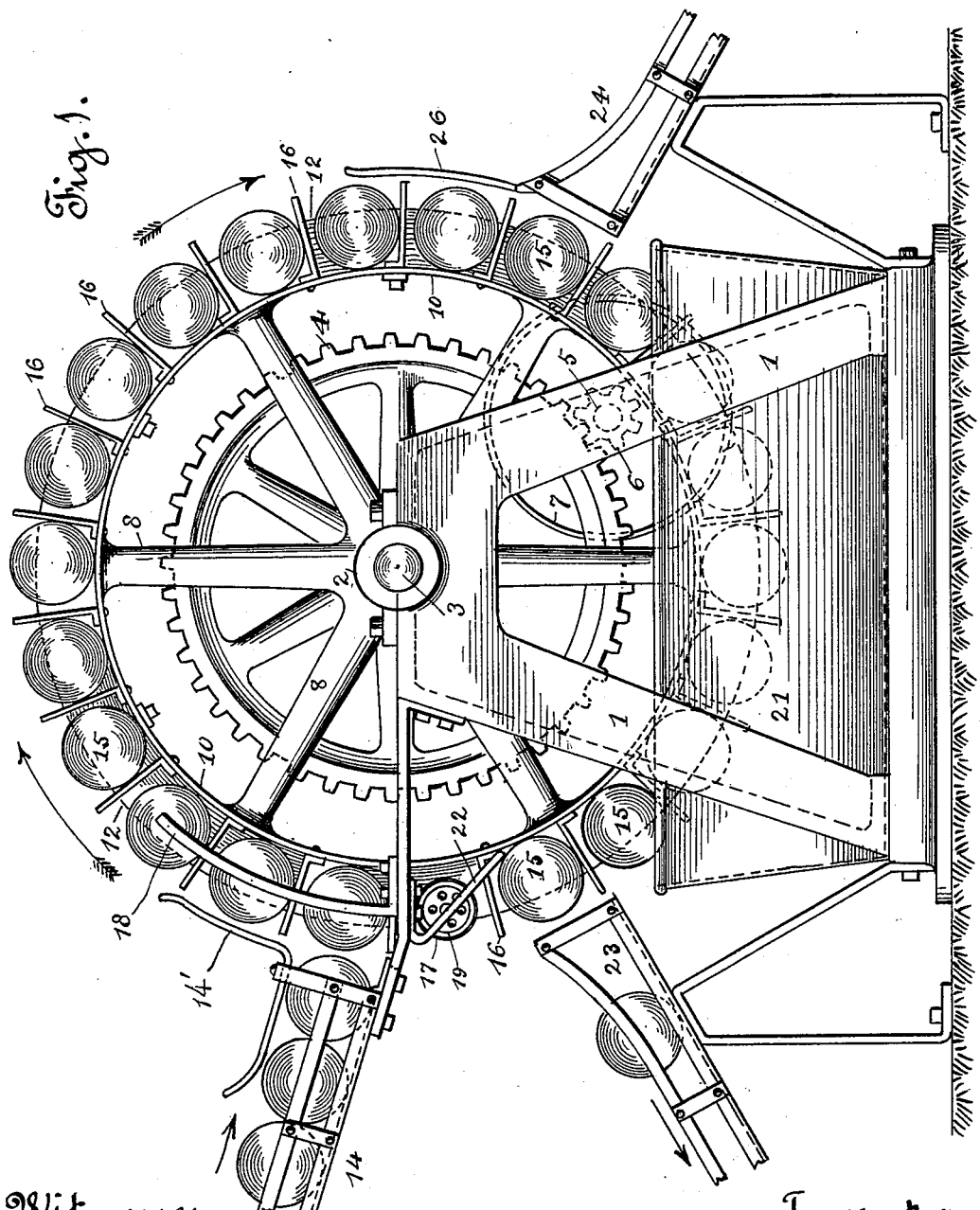
Witnesses. Inventor.
H. C. Black.

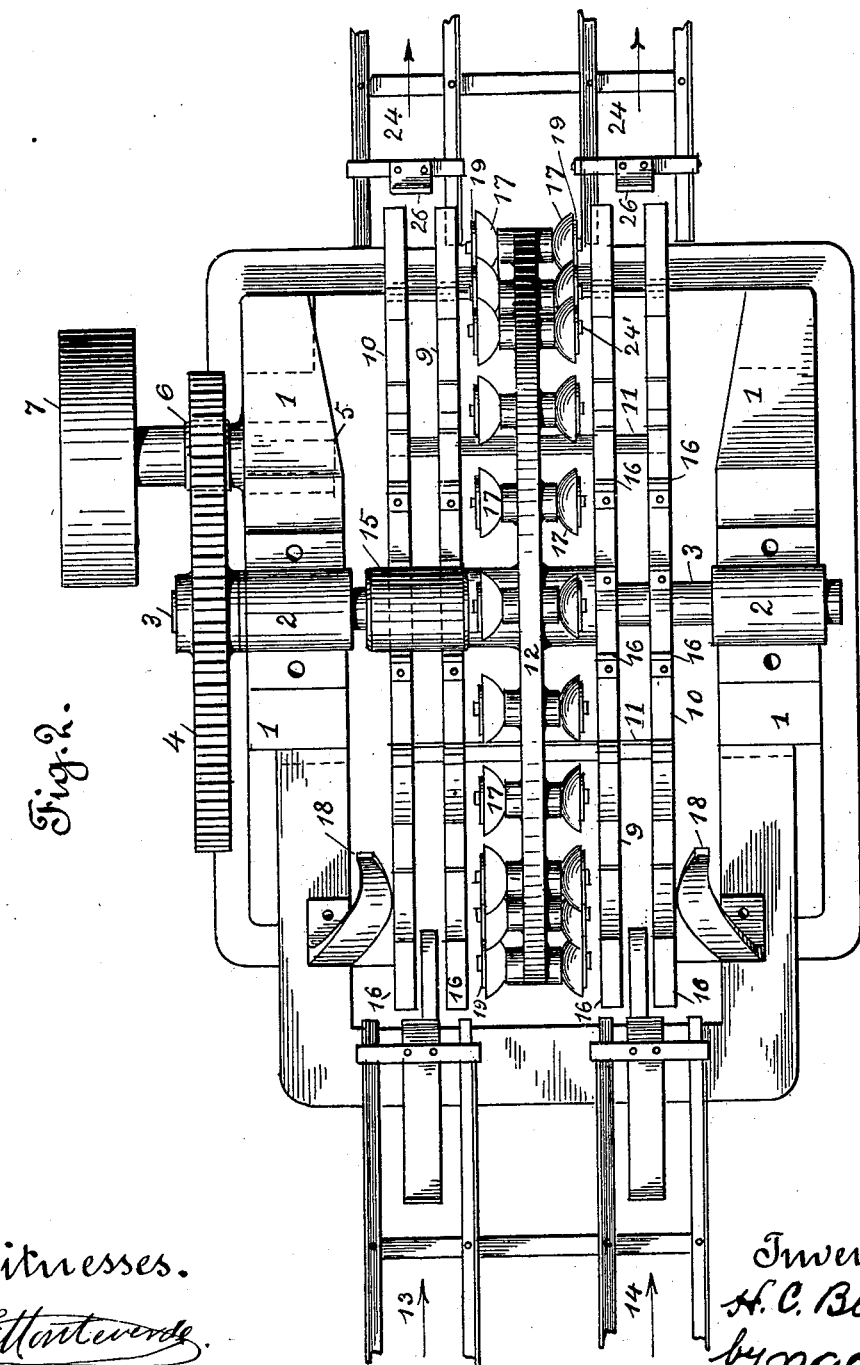

No. 700,891. Patented May 27, 1902.
H. C. BLACK.
CAN TESTING APPARATUS.
(Application filed Nov. 20, 1901.)
(No Model.) 3 Sheets—Sheet 3.
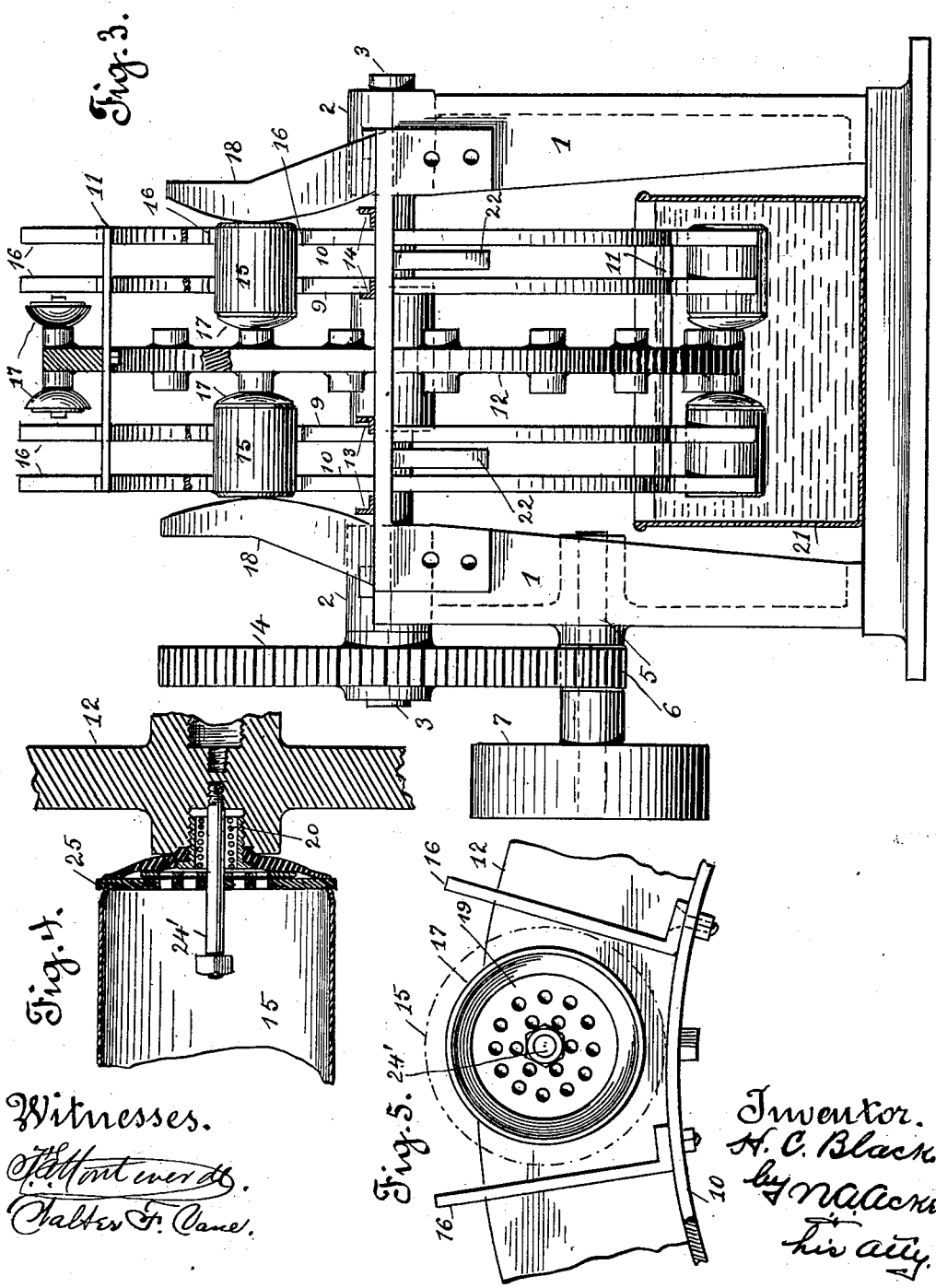

UNITED STATES PATENT OFFICE.

HENRY C. BLACK, OF OAKLAND, CALIFORNIA.

CAN-TESTING APPARATUS.

SPECIFICATION forming part of Letters Patent No. 700,891, dated May 27, 1902.

Application filed November 20, 1901. Serial No. 83,009. (No model.)

*To all whom it may concern:*

Be it known that I, HENRY C. BLACK, a citizen of the United States, residing at Oakland, county of Alameda, State of California, have invented certain new and useful Improvements in Can-Testing Apparatus; and I do hereby declare the following to be a full, clear, and exact description of the same.

The present invention relates to certain new and useful improvements in can-testing machinery, which consists in the arrangement of parts and details of construction, as will be hereinafter fully set forth in the drawings and pointed out in the specification.

Ordinarily complicated mechanism is required for the testing of cans, which comprise means for submerging the cans within a body of water. In this class of testers the detection of leaky cans is dependent upon the operator noting bubbles created by the escape of air from within the cans. This is a difficult matter where the water is continually agitated by the mechanism with the held cans moving into and out of the tester-bath. As a result it ofttimes happens that leaky cans are permitted to escape as good cans, while perfect cans are thrown out as leaky cans. In the other class of can-testers a vacuum or exhaust pump is used. The objection to this style of tester is the failure to detect exceedingly minute openings in the cans.

The object of the present invention is to dispose of the tester-bath employed in connection with the bath-testers and to dispense with the pump mechanism made use of in the class of dry testers, to simplify the construction of the can-testing mechanism, and to provide a tester whereby the most minute leak will be readily detected by the can automatically freeing itself and falling away from the holding means.

To comprehend the invention, reference should be had to the accompanying drawings, wherein—

Figure 1 is a side view in elevation of the apparatus. Fig. 2 is a top plan view of the mechanism disclosed in Fig. 1 of the drawings. Fig. 3 is an end view in elevation, partly broken. Fig. 4 is an enlarged broken sectional view illustrating an open-mouth can held against one of the sucker-disks; and Fig. 5 is a front detail view of one of the sucker-disks, the disk attachment for open-mouth can being removed.

In the drawings the numeral 1 is used to indicate any suitable form of supporting-frame, within bearings 2 of which works the cross-shaft 3. To this shaft is secured a gear-wheel 4, which is driven from shaft 5 by means of the pinion 6, secured thereon, meshing with gear-wheel 4. The shaft 5 has motion imparted thereto by means of a belt (not shown) working over belt-wheel 7, attached to one end of said shaft. However, any suitable mechanism may be employed to impart rotation to cross-shaft 3. To cross-shaft 3 is attached the spider 8, which carries at each side the rings 9 10. These rings are attached to the spider by means of the brackets or supporting-plates 11, bolted or otherwise secured to the under face of the rim 12. The cans 15 to be tested as delivered from the feed-chutes or runways 13 14 are received upon these rings at each side of the wheel or rim 12, being held in place by holding devices 16, upwardly projecting from the rings 9 10. There is a holding device provided for each can, which holding devices are arranged equidistant apart the entire circumference of the said rings, the distance between the pins, lugs, or plates being sufficient to permit of a can fitting therebetween.

To the rim or wheel 12, at each side or face thereof, a number of rubber sucker or cup-shaped disks 17 are secured. These disks are so arranged as to be in line with the mouth or open end of the can when received upon the supporting carrier-rings 9 10 between the holding pins, lugs, or plates 16.

Each feed-runway 13 14 is provided near its lower end with an upwardly-projecting member 14', which members serve as a guard-plate for holding the cans from moving from within their seats.

The feed-chutes 13 14 are of the usual construction, the cans rolling therein by gravity toward the tester. Immediately above the feed chutes or runways are arranged the cams 18, which are located so as to bear against the free end of the cans 15 as carried above the feed chutes or runways and force same inward against the sucker-disks 17 in order to compress same. Within each sucker-disk there is arranged a valve 19, held outwardly pressed by spring 20. Each disk 19 is slidable upon a stud 24', projecting from the rotatable disk 12. The spring 20 surrounds said stud and bears against the inner face of valve 19, which is prevented from being forced off of stud 24' by means of the nut secured to the free end thereof. The valve 19 bears against the head end of the cans being tested, exerting a constant pressure thereon through the medium of the spring 20. As the free end of the cans move off of or away from cams 18 the compressed sucker-disks by their own elasticity resume their normal shape—that is, they move outward. This action of the sucker-disks withdraws air from within the can and creates a vacuum therein and causes the can to adhere tightly to the said disks. If the can is a perfect one, the vacuum will remain undisturbed and the can will be carried around by the rotation of the spider 8, which moves in a vertical plane, and through the bath contained in receptacle 21. This bath is employed for the purpose of washing the can in order to clean same. As the cans are carried out of the bath they bear against the inclined plates or rods 22 and are gradually forced over until a portion thereof moves away from its sucker-disk and destroys the vacuum. The cans as thus released or freed fall into runway or discharge-chutes 23.

The perforated valve 19 bears against the open head end of the can, the pressure of spring 20 thereon being almost sufficient to counterbalance the atmospheric pressure upon the can. Being thus held, the admission of air to the interior of the can is permitted within the period of a few seconds through the most minute opening. Practice has demonstrated the detection of a leak through an opening in the can of less than a pin-point within a period of five seconds, sufficient air entering the can within said time to destroy the vacuum and cause the can to fall from its sucker-disk.

The leaky cans move from their seats and fall into runways 24, located at a point opposite the feed-chutes for the cans.

In case of cans having a full opening or one unheaded end are to be tested there is loosely secured to stud 24' in advance of valve 19 a perforated disk 25. This disk is of sufficient diameter to entirely cover the open end of the can and to bear upon the edge thereof when the can is forced toward the sucker-disk, as carried past cam 18. The disk 25 serves as a bearing for valve 19.

The imperfect cans are held within their seats until the discharge-runways 24 are reached by means of the guard-plates 26.

In the present machine two cans are received at the same time. This feature is immaterial, simply being so constructed in order to increase the capacity of the machine. I do not wish to be understood as confining myself to such construction, for the means may be readily changed to receive only a single can.

Having thus described the invention, what is claimed as new, and desired to be protected by Letters Patent, is—

1. In a can-testing apparatus, the combination with a rotatable wheel, of sucker-disks attached to and carried by the rotatable wheel, means for placing the open end of the can to be tested in contact with said sucker-disk so as to cause the can to adhere thereto, and devices whereby an outward pressure is exerted upon the can held by the disks.

2. A can-tester comprising a sucker-disk and means for placing the open end of a can to be tested in contact with said sucker-disk, whereby the disk is compressed by such movement so that when the pressure is released the disk will expand and cause a vacuum within the can, and devices for exerting an outward pressure to the held can.

3. In a can-tester, the combination with the sucker-disk, of a spring-pressed valve arranged therein, said valve designed to bear against the open end of the can to be tested and to exert an outward pressure thereon.

4. The combination with the sucker-disk, of a spring-pressed valve arranged therein so as to bear against and to exert an outward pressure to the can being tested, and means for placing the open end of the can to be tested in contact with the sucker-disk.

5. The combination with a rotatable wheel, means for imparting rotation thereto, the can-holding rings arranged to one side of the rotatable wheel and moving in unison therewith, can-feed chute by which cans are delivered to said holding-rings, device whereby the cans are held in place, a series of sucker-disks attached to the rotatable wheel, device by means of which the can is forced against its sucker-disk, devices for exerting an outward pressure to the cans being tested, and means for releasing the perfect or non-leaky cans.

6. The combination with rotatable mechanism, a series of sucker-disks carried thereby, means whereby the open end of the can to be tested is placed in contact with the sucker-disk, spring-held valve for exerting an outward pressure upon the held can, and device whereby the perfect or non-leaky cans are removed from the sucker-disks.

7. In a can-tester, the combination with rotatable mechanism, a series of sucker-disks attached thereto which receive and hold the cans, means for exerting a constant out pressure upon the held cans, a bath through which the cans are conveyed so as to wash same, and means whereby the tested cans are removed from the sucker-disks.

8. The combination with a can-tester, of a series of compressible sucker-disks attached thereto, and means whereby an outward pressure is exerted upon the can held by the disk.

In witness whereof I have hereunto set my hand.

HENRY C. BLACK.

Witnesses:
N. A. ACKER,
D. B. RICHARDS.